United States Patent [19]  [11] 3,763,585
Mosch [45] *Oct. 9, 1973

[54] WARNING DEVICE
[76] Inventor: Alfred Mosch, 442 Poplar Street, Bridgeport, Conn. 06605
[ * ] Notice: The portion of the term of this patent subsequent to July 27, 1988, has been disclaimed.
[22] Filed: May 6, 1971
[21] Appl. No.: 140,657

Related U.S. Application Data
[63] Continuation-in-part of Ser. No. 741,970, July 2, 1968, Pat. No. 3,594,938.

[52] U.S. Cl. .............................................. 40/129 C
[51] Int. Cl. .............................................. G09f 7/00
[58] Field of Search .............. 40/125 F, 128, 129 R, 40/129 A, 129 C

[56] References Cited
UNITED STATES PATENTS
3,594,938  7/1971  Mosch............................. 40/129 C
2,437,845  3/1948  Wyeth............................. 40/129 C
2,620,579  12/1952 Dienes............................ 40/129 C
2,821,035  1/1958  Joseph............................ 40/129 A
1,484,231  2/1924  Pistocco.......................... 40/128

Primary Examiner—Hugh R. Chamblee
Assistant Examiner—J. A. Oliff
Attorney—Ernest F. Marmorek

[57] ABSTRACT

Disclosed is a warning device for vehicles comprising a rectangular warning sign of flexible material two rods for reinforcing opposite edges of the sign, each rod having a flat surface and an outwardly projecting curved surface; two elastic bands affixed to the ends of the reinforcing rods, respectively, and extending adjacent to flat surfaces thereof; hook-like members coupled to a center portion of respective elastic bands and each having a projecting hook shaped according to the curved surface, so as in the rolled condition of the device the hooks are substantially levelled with the curved surface whereas in the displayed position thereof the hooks serve for the attachment to the vehicle.

8 Claims, 11 Drawing Figures

PATENTED OCT 9 1973　　　　　　　　　　　　　　3,763,585
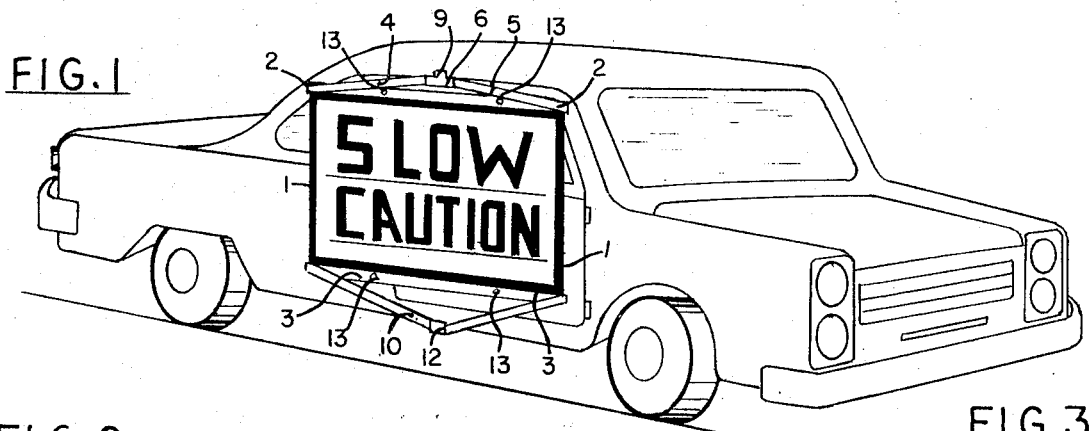
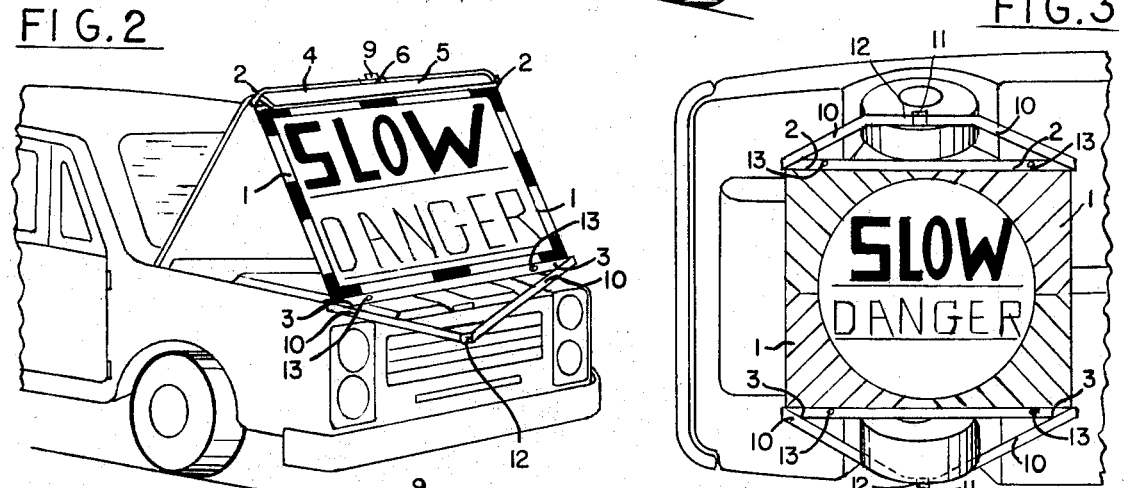
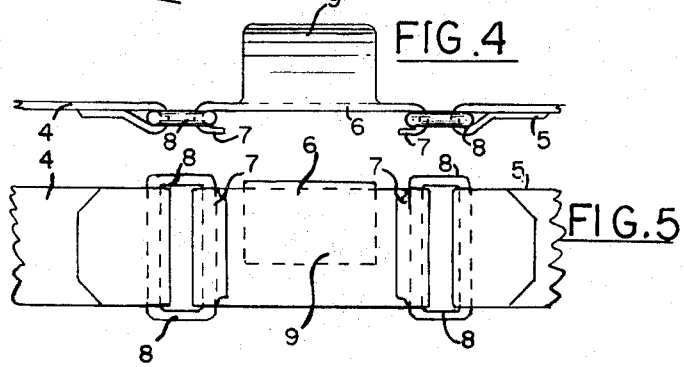
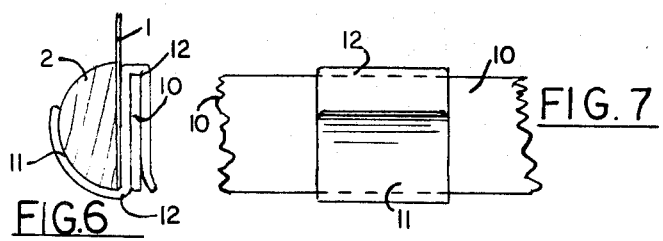
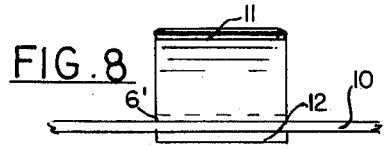
INVENTOR:
ALFRED MOSCH,
BY
His ATTORNEY.

WARNING DEVICE

This is a continuation-in-part to my copending application Ser. number 741,970 filed on July 2, 1968, now U.S. Pat. No. 3,594,938, July 27,1971 and entitled "Warning Device."

BACKGROUND OF THE INVENTION

This invention relates generally to warning devices adapted for being removably attached to vehicles.

More particularly, this invention relates to attachment means for member

There are known electrical warning means for a motor vehicle, such as tail lights flashers and many other signalling devices which are either fixedly attached to the vehicle or depend in their operation on a battery. The failure of the battery, however, is very often the very cause of the vehicle being disabled and, consequently, no warning is given to an approaching driver. Similarly, exchangeable battery cells in conventional portable electric warning devices are subject to aging and require regular checking and replacement.

Known are also flexible sheet-like signs which can be displayed, secured to a disabled vehicle by means of strings and, after the emergency has passed, rolled into a compact cylindrical shape.

The disadvantage of the known foldable warning devices is in the fact that they can be reliably secured to limited areas of the disabled vehicle only, mostly to its rear portion.

If the disabled vehicle has spun around as the result of a skid or collision, or has turned over on its side or back, in such events it is obvious that the electrical warning devices attached in fixed position to the cover of the trunk compartment are useless.

It is, therefore, an object of this invention to provide a simple warning device for motor vehicles which can be temporarily secured to any surface portion of the majority of current models of vehicles, regardless of the position the vehicle may occur in after a skid on the road, a collision or other cause.

Another object of this invention is to provide a portable warning device which in use will hook onto the edges of bumpers, grill, licence plate, drip moldings, windows, undersides, wheels, doors etc. of the vehicle.

It is still another object of this invention to provide attachment means for the warning device which can be easily manipulated and which enables it to be attached to different vehicle parts or to be extended forward to the car into the partly open rear windows of vehicles which have no trunk compartment covers, or if the weather condition does not permit, to open the trunk covers to display the warning sign.

It is a further object of this invention to provide a warning device which, after the emergency has passed, may easily be detached from the vehicle, folded in half and rolled up into a compact cylindrical form, and stored in any suitable place in the vehicle.

Still another object of this invention is to provide a portable warning device which can be removed from the vehicle and displayed at a suitable distance away or held by hand to give the warning to the approaching drivers a safe distance away from the scene of an accident.

SUMMARY OF THE INVENTION

According to this invention, the above objects are attained by providing a warning device for motor vehicles comprising a substantially rectangular warning sign of flexible, sheet-like material, two reinforcing rods each having a flat surface and a convex surface, the two opposite edges of the sign being affixed to the flat surfaces; two elastic bands affixed at their ends to the ends of respective reinforcing rods for extending adjacent the individual flat surfaces; hook-like clamping means secured to the elastic bands, respectively, each of the clamping means having a projecting clamp matching the contour of a part of the curved surface of the reinforcing rod. In this manner, clamps are adapted for being either clamped on the reinforcing rods when the warning sign is to be rolled up or for being hooked up on suitable parts of the disabled vehicle when the warning device is displayed.

One of the elastic bands can be divided at its center and provided at the resulting free ends with annular catch members and the clamping member is disconnectably attached to the catch members by lateral hooks formed on a coupling plate.

BRIEF DESCRIPTION OF THE DRAWING

For a better understanding of the invention, reference may be made to the following description of several exemplary embodiments, taken in conjunction with the accompanying drawing in which FIG. 1 is a perspective view of a disabled vehicle having a displayed device of this invention attached to its side surface;

FIG. 2 is a fragmentary perspective view of the front part of a disabled vehicle having a displayed device of this invention attached between a grill edge and the open motor hood;

FIG. 3 is a fragmentary perspective view of the bottom of a disabled vehicle lying on its side, with the displayed device of this invention attached between the rear wheels;

FIG. 4 is a plan view of the hook-like holding member in connection with catch members on two elastic band sections;

FIG. 5 is an elevational view of the holding member of FIG. 4;

FIG. 6 is a side view of another modification of the hook-like holding member in connection with an undivided elastic band;

FIG. 7 is an elevational view of the holding me mber of FIG. 6;

FIG. 8 is a bottom view of the holding members as shown in FIGS. 6 and 7;

FIG. 9 is a side view of two abutting reinforcing rods having hexagonal configuration;

FIG. 10 is a side view of a modification of the device of this invention with longitudinal grooves for elastic strings; and FIG. 11 is a side view of still another variation of the device of this invention with jointed U-shaped supporting rods and having the elastic bands located at the outside of the rods.

DETAILED DESCRIPTION

Referring now to FIG. 1, a rectangular sheet-like warning sign 1 of flexible material is removably attached and displayed to the side of a disabled vehicle. The warning sign 1 is provided with suitable symbols or messages of caution to warn all approaching motorists of the danger ahead.

The top edge of the warning sign 1 is reinforced by an upper rod 2 and the bottom edge of the sign 1 is reinforced by an identical lower rod 3. Each of the reinforcing rods 2 and 3 has a longitudinal flat surface and a longitudinal convex (half-round) surface. The edge portions of the sheet-like sign 1 are affixed to respective flat surfaces (as shown in FIGS. 6 and 9). As illustrated in FIGS. 4 and 5, the upper reinforcing rod 2 has affixed to the ends thereof respective end portions of elastic band sections 4 and 5. The free ends of the band sections 4 and 5 are provided with annular catches 8. By means of a hook-like portions 7 located at two opposite lateral edges of a coupling plate 6, the catches 8 are hooked up to the plate 6, thereby uniting the band sections 4 and 5 into a single elastic band extending along the longitudinal flat surface of the upper rod 2. The upper edge of the coupling plate 6 is integral with a projecting clamp 9 shaped for matching the contour of the convex surface of the rod 2, (as shown with reference to a corresponding clamp 11 in FIG. 6). In the normal position of the connected elastic band sections 4 and 5, the clamp 9 rests on the curved surface of the rod 2.

The lower reinforcing rod 3 has fastened to its end portions the ends of the single-piece elastic band 10 which extends in its normal position along the flat surface of the bottom reinforcing rod 3. The attachment member for the single-piece elastic band 10 differs from the previously described clamping means 7 to 9 in that its coupling plate 6' is without lateral hooks and is provided instead with a snap member 12 for clamping the plate 6' directly to the central portion of the single-piece elastic band 10 (FIG. 8). The clamp 11, projecting from the coupling plate 6' opposite to the snap member 12 is shaped similarly as the clamp 9 for matching the convex surface of the rod 3.

The catches 8 on the ends of band sections 4 and 5 may be also used for removably attaching the warning device to the vehicle, for example to the drip molding on the roof, to the upper and lower parts of the doors, windows etc.

The clamps 9 and 11, on the other hand, are intended for grabbing or for being hooked up to most parts of a vehicle, such as to the bumpers grill, licence plates, portions of partly open doors, windows, undersides etc.

If desired, the top elastic band sectors 4 and 5 may be replaced by a single elastic band 10 with a snap-on plate 12, as shown in FIGS. 3, 6 and 8.

When the emergency has passed, the elastic bands 4, 5 and 10 are unhooked from the vehicle, the hook-shaped clamps 9 and 11 snap on to the reinforcing rods 2 and 3, respectively. The two reinforcing rods are subsequently placed flat side against the flat side forming a cylinder onto which the now folded in half sheet-like warning sign is rolled up and placed into a protective tube and may now be stored anywhere in the vehicle, such as for example, on top of the rear seat or inside the trunk compartment.

A plurality of holes 13 (FIG. 2) may be provided in the upper and lower reinforcing rods 2 and 3 for the case that the warning device might be permanently attached to the underside of the trunk cover with suitable fasteners, if so desired. When the trunk is opened and its cover lifted, the warning sign is displayed at all times.

Referring now to FIGS. 9 to 11, there are illustrated various modifications of the outwardly projecting convex surface and of the arrangement of the elastic bands according to this invention. The convex longitudinal surfaces 2' and 3' as shown in FIG. 9 form together a hexagon onto which the sheet-like sign is rolled up. In the modification of FIG. 10, the outwardly projecting external surfaces 2'' and 3'' are provided with grooves or channels 15 for elastic cords or strings 10''. As illustrated in FIG. 11, the supporting rods or members 2''' and 3''' have rectangular cross-sections with rounded edges. The elastic band 10''' is provided with clamping members which snap engage the flat surfaces of the supporting snap members 2''' and 3'''.

It will be understood that this invention is not limited to the particular embodiments described herein and that many modifications retaining and utilizing the spirit thereof will occur to those skilled in the art. It is therefore contemplated by the appended claims to cover all such modifications as full within the scope and spirit of the invention.

I claim:

1. In a portable warning device for use in being removably mounted on a support such as a vehicle, containing a flexible warning sign with an upper edge and a lower edge and being adapted to be rolled up and unrolled, respectively, two rod-like reinforcements each having a longitudinally extending convex external surface and a longitudinally extending flat internal surface, said upper and lower edges of said sign being connected to the flat surfaces of said reinforcements, respectively, and attachment means comprising elastic band means extending along at least a portion of said longitudinally extending flat surfaces of each of said reinforcements and being secured near their ends to the end portions of said reinforcements;

clamping means respectively coupled to a central portion of said elastic band means of each of said reinforcements, each clamping means including a projecting attachment portion substantially matching the contour of said longitudinally extending external surface for being clipped thereto during the rolled-up condition of said warning sign, whereas in the unrolled display condition of said warning sign said clamping means serve for being disconnectably mounted on a support.

2. In a portable warning device according to claim 1, said clamping means further including a flat snap member arranged for attachment to said elastic band means.

3. In a portable warning device according to claim 1, said attachment means comprising at least one divided elastic band, free end portions of said divided band being provided with catch members respectively, and an attachment clamp including a coupling plate with lateral hook portions for connecting said catch members.

4. In a portable warning device according to claim 1, each of said convex external surfaces having a half-round configuration.

5. In a portable warning device according to claim 1, each of said convex external surfaces having a semi-hexagonal configuration.

6. In a portable device according to claim 5, the top surface portions of said semi-hexagonal convex surfaces being provided with grooves for receiving said elastic band means.

7. In a portable device according to claim 1, each of said convex external surfaces having a U-shaped configuration with a flattened top surface portion, said upper and lower edges of said sign being connected to said flattened top surface portions, respectively, and said elastic band means extending along said flattened top surface portions.

8. In a portable device according to claim 7, the arms of one of said U-shaped convex external surfaces being provided with projections for clamping the arms of the other U-shaped surface.

* * * * *